United States Patent [19]

Fernström

[11] Patent Number: 5,550,827
[45] Date of Patent: Aug. 27, 1996

[54] CONTROL OF THE INTERCHANGE OF DATA PACKETS IN A NETWORK

[75] Inventor: Kenneth G. Fernström, Hägersten, Sweden

[73] Assignee: Telefonaktiebolaget LM Ericsson, Stockholm, Sweden

[21] Appl. No.: 428,479

[22] Filed: Apr. 27, 1995

Related U.S. Application Data

[63] Continuation of Ser. No. 59,936, May 11, 1993, abandoned.

[30] Foreign Application Priority Data

May 11, 1992 [SE] Sweden ................................. 9201495

[51] Int. Cl.⁶ ............................................. H04J 3/02
[52] U.S. Cl. ............................................. 370/94.1; 370/99
[58] Field of Search ............................. 370/94.1, 99, 60

[56] References Cited

U.S. PATENT DOCUMENTS

| | | | |
|---|---|---|---|
| 4,491,945 | 1/1985 | Turner | 370/60 |
| 4,542,498 | 9/1985 | Bodros et al. | 370/60 |
| 4,646,287 | 2/1987 | Larson et al. | 370/60 |
| 4,670,871 | 6/1987 | Vaidya | 370/60 |
| 4,755,992 | 7/1988 | Albal | 370/99 |
| 4,811,339 | 3/1989 | Bouillot et al. | 370/94.1 |
| 4,858,228 | 8/1989 | Hoshi | 370/60 |
| 5,012,470 | 4/1991 | Shobu et al. | 370/99 |
| 5,130,978 | 7/1992 | Mobasser | 370/60 |

FOREIGN PATENT DOCUMENTS

| | | |
|---|---|---|
| 0186343A2 | 7/1986 | European Pat. Off. . |
| 0244117A2 | 11/1987 | European Pat. Off. . |
| 0419805 | 4/1991 | European Pat. Off. . |
| 0431438 | 6/1991 | European Pat. Off. . |
| 2643933A1 | 3/1978 | Germany . |
| 2252020 | 7/1992 | United Kingdom . |
| WO92/05648 | 4/1992 | WIPO . |

*Primary Examiner*—Douglas W. Olms
*Assistant Examiner*—Min Jung
*Attorney, Agent, or Firm*—Burns, Doane, Swecker & Mathis, L.L.P.

[57] ABSTRACT

In a network data packets are transferred between stations through communications lines. The data packets consist of a sequence of bytes, some of which are flags and other bytes contain the true information of the data packet. The bytes, which contain flags, have a unique configuration whereby it is always possible to distinguish them from other bytes comprised in the message. The flags signal the beginning of various information fields and they may also contain information which is associated with the local transmission on the communication line where the data packet at a special moment is being transferred. A flag byte may thus have a one as its most significant bit and other bytes may have a zero in this position. Flagbytes containing status information for the communication line, whereon the data packet is being transferred at the considered moment, are normally always transmitted on the communication lines when there is no data packet to be sent. They can also be transmitted within data packets in order to quickly inform the other station, which is connected to a communication line, of a change of the state of the transmitting station. These sending patterns are also used to determine whether a communication line is operative or not and whether a data packet has been transferred correctly from one attached station to the next station.

20 Claims, 6 Drawing Sheets

| DF Destination flag | Destination adress information | PF Payload flag | Payload data | SF Source address flag | Source address information | EF End flag |
|---|---|---|---|---|---|---|
| 1 byte | 0 - several bytes | 1 byte | 0 - several bytes | 0 or 1 byte | 0 - several bytes | 1 byte |

↑ First transmitted byte

↑ Last transmitted byte

Fig. 6

Flagbyte

MSB | 1 | · | · | · | · | · | · | · |

Fig. 7

Other byte

MSB | 0 | · | · | · | · | · | · | · |

Fig. 8

| DF | 1 | 0 | 0 | 1 | P | 0 | 0 | 1 |
|---|---|---|---|---|---|---|---|---|
| PF | 1 | · | · | · | 0 | 1 | 1 | · |
| SF | 1 | · | · | · | 1 | 0 | 0 | · |
| EF | 1 | · | · | · | 1 | 0 | 1 | · |
| RF | 1 | · | · | · | 1 | 1 | 0 | · |

Fig. 9

RF { RR  | 1 | 0 | 0 | · | 1 | 1 | 0 | · |
     RNR | 1 | 0 | 1 | · | 1 | 1 | 0 | · |

CONTROL OF THE INTERCHANGE OF DATA PACKETS IN A NETWORK

This application is a continuation of application Ser. No. 08/059,936, filed May 11, 1993, now abandoned.

FIELD OF THE INVENTION

The present invention is related to processes and devices for facilitating the transfer of data packets in packet networks.

BACKGROUND OF THE INVENTION

In the transfer of certain types of messages in data packet networks, such as system messages relating to establishment of connections or taking connections out of operation, it is required, that the transfer of the messages is performed rapidly and that no blocking or barring of transmission nodes can occur. Further there is a need of forwarding the state of various nodes in the packet network without extra signalling lines.

PRIOR ART

In protocols disclosed in the documents U.S. Pat. No. 4,542,498, EP-A 0 419 805 and U.S. Pat. No. 4,811,339 and "As specified in international recommendations", see said first document, col. 1, line 20, flags are used to separate frames transmitted in a packet mode channel, these flags comprising a number of, at least six, binary ones, these consecutively transmitted bits being immediately preceded and followed by at least one zero bit. These frame separating flags, thus comprising at least eight bits, may be sent anywhere in the successive sequence of transmitted binary units and can thus be located in two successively transmitted bytes. This particular flag configuration requires that all packets to be sent must be examined in advance for all bit patterns similar to that of the flag and then the similar bit patterns have to rearranged in order to make them distinguishable from the flags. In addition this examination must be performed across each byte border. After receiving a packet it is examined again to rearrange the earlier changed bit patterns to the original ones. This procedure is obviously time consuming and also requires complicated logic circuits, as illustrated by the documents cited.

Methods for control of the transmission of data between two stations are also disclosed in U.S. Pat. Nos. 4,491,945, 4,670,871, 4,858,228 and EP-A 0 431 438, the latter documents in particular disclosing methods for acknowledging transfer of a data packet over a link, including time-outs. The continuous transmitting of idling patterns on connection links for monitoring the link, in the absence of the transmission of regular data packets, is for instance disclosed in U.S. Pat. No. 4,646,287.

SUMMARY OF THE INVENTION

The requirements and needs mentioned above are fulfilled by the invention, the definitions and characteristics of which appear from the appended claims.

In a network data packets are transferred in some conventional way such as in a ATM network. The various bytes transmitted in the data packets and also in all of the traffic flow between stations or nodes in the network have a particular configuration. Thus each forwarded byte either belongs to the category flag bytes or the category other bytes. The flag bytes signal the beginning of an information field or they convey system information only being relevant to the traffic flow in the network and in particular to the traffic flow on the transmission line or connection link, on which a data packet is being transferred. The other bytes being transmitted contain the proper information or payload, which is moved between various terminal stations in the network. Thus all flag bytes have a unique structure, for instance such as that their first binary unit, the most significant bit, is set to a binary one, while in other bytes this first bit is set to zero. Such an unambiguous format provides significant advantages in the control of the traffic flow between two stations which are connected by means of a connection line.

Particular flag bytes thus contain information relevant to the state of the station transmitting a flag byte, these particular flag bytes being called state bytes or status bytes. Normally also these state bytes are transmitted on a line from a station, when there is no data packet being transmitted from the station on this line. Owing to the unique configuration of these state bytes they can be sent incorporated or inserted at arbitrary locations in the data packets and still easily be distinguished by the station receiving the data packet. The specific byte format thus allows a very rapid and simple transmission of state information from one station to another station connected thereto reducing the complexity of the stations.

Such a transmission of a state byte is always performed on a connection from a station, if a receiving unit for the connection in the station changes its status, for instance from one state, where the unit and thus the station is ready to receive messages on said connection link, to the state, where the unit and the station is not ready to receive messages on the same connection link. Exactly this case occurs, when a station detects the beginning of reception of a data packet on a connection link. The station then has earlier indicated, that it is ready to receive data packets on said connection link and then it will transmit, immediately at the beginning of the reception of the data packet, a special state byte having the meaning, that the station is not any longer ready to receive any more data packets on the connection link. This change of state is also monitored by the station sending the data packet in question. The sending station must have received such a status byte within a predetermined time period after the beginning of the transmission of the data packet. If such an acknowledging status byte is not obtained, the sending station decides, that the connection line is not usable any longer and will for instance send a message thereof to some monitoring unit or some other procedure is initiated for handling the error.

Since bytes and in particular flag bytes always are transmitted on all connection lines, errors may also be detected, if the connected stations will not any longer sense, that bytes are received on the connection lines. Thus a connection line may in this way be determined to be defective, if no bytes regardless type are received on the line during a certain predetermined time period.

BRIEF DESCRIPTION OF THE DRAWINGS

The invention will now be described as an exemplary embodiment, which is given only for illustrative purposes and not intended to limit the scope of the invention, and with reference to the accompanying drawings, on which

DETAILED DESCRIPTION

Figure 1:
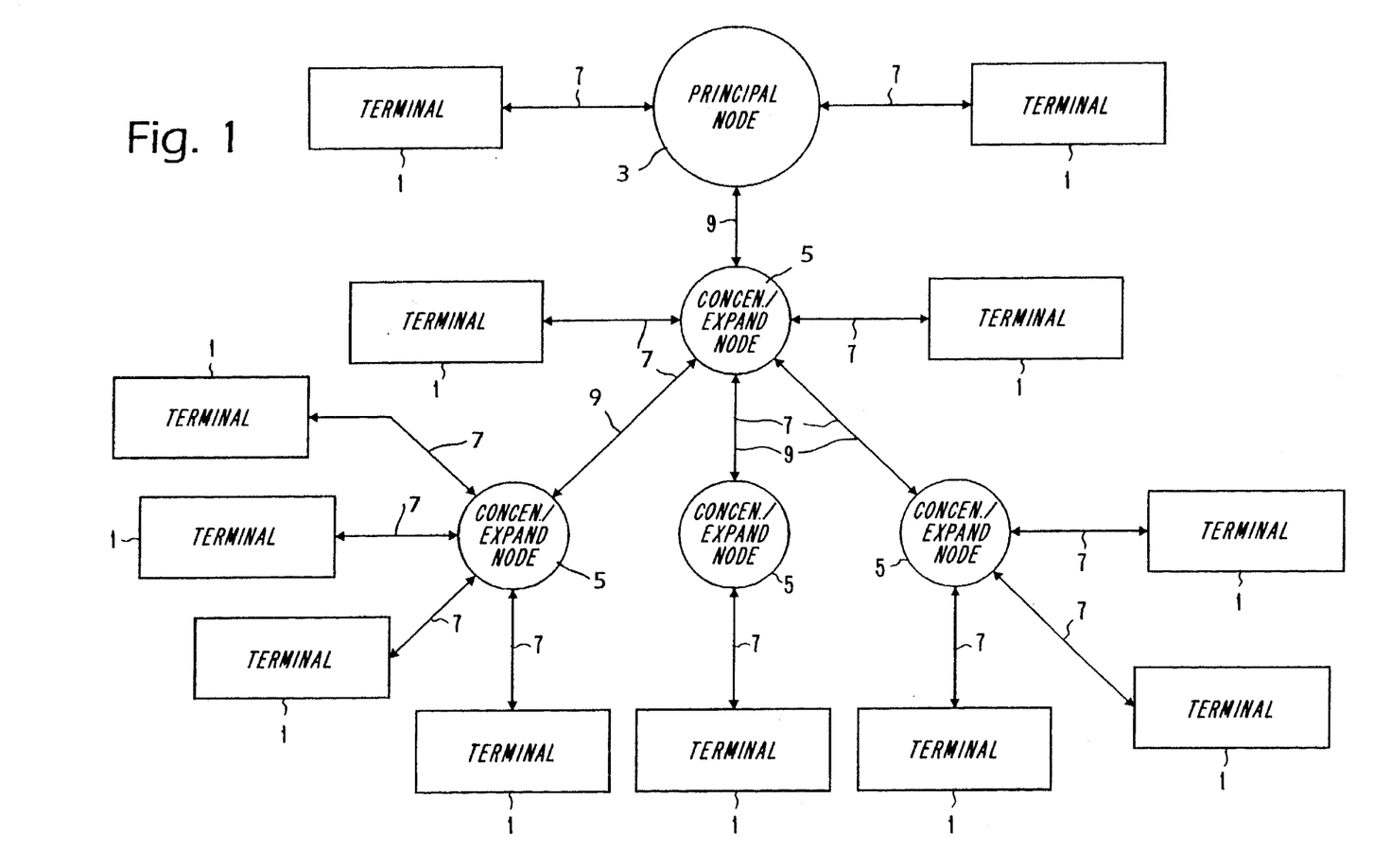
FIG. 1 shows a schematic picture of a data packet network in which the invention can be used.

In FIG. 1 a network is schematically illustrated in which the invention can be used. It is a hierarchic type but the invention can be used in most network architectures. Messages are sent from and to terminals 1 through intermediate nodes. In the hierarchic network in FIG. 1 there is thus a principal node 3, through which all messages pass. In addition there is a number of concentrating/expanding nodes 5. They have on their expanding side a number of two-way connections or links 7 and on the concentrating side only one two-way connection or link 9, the other end of which is connected either to the expanding side of another node or to the principal node. The connections 7 on the expanding side can pass to the concentrating side of other nodes or directly to a terminal 1.

In the network messages of packet type are transferred which can contain various kinds of system information like orders for setting up connections, for taking connections out of service, etc. The addressing is made by means of an address field in the data packet in the way described in the international patent application PCT/SE91/00626 which is incorporated as a reference herein. In the same way as is described in this patent application address information is gradually removed from the data packet in the transfer thereof through the nodes over the network and at the same time address information is gradually added to the data packet in regard of the path to the original terminal, from which the data packet was forwarded.

Figure 5:
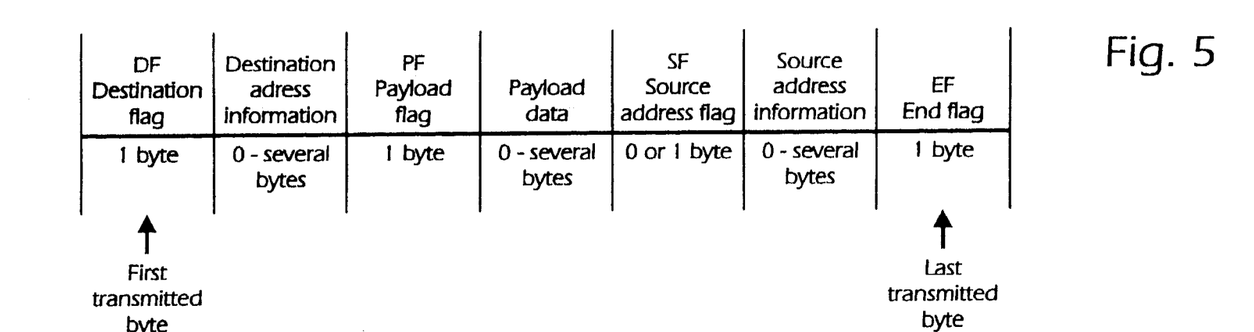
FIG. 5 shows the configuration of a data packet.

In FIG. 5 the general structure of a data packet is shown. The data packet comprises a number of flags, each one comprising one byte. Certain flags indicate, that other information follow the flag. Thus a destination flag DF indicates the beginning of the data packet and also that after this byte a number of bytes can follow, which contain information of the address to the destination, in a manner illustrated in the patent application cited above. After the destination address field a message flag or payload flag PF follows, indicating the beginning of the payload field containing the higher-order information or payload of the data packet, that is the portion which is to be transferred to a receiving terminal or the destination. Information relating to the place from which the message originates is located in a number of bytes after a source address flag SF. The data packets are always terminated by an end flag or stop flag EF.

Figure 6:
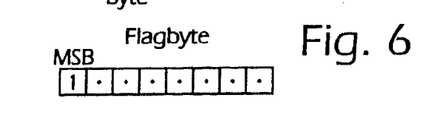
FIGS. 6 and 7 show the configuration of a flag byte and a non-flag byte.
Figure 7:
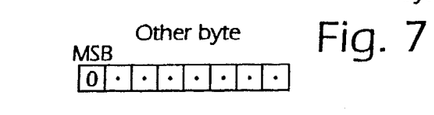

As is illustrated in FIGS. 6 and 7, the flags and the other bytes being comprised in a data packet have such a configuration, that it directly from each byte appears, if it is a flag byte or if it is a byte belonging to some other part of the data packet, such as a byte belonging to an address field or the message portion itself. Thus each flag has its most significant bit (MSB) set to a binary one, while other bytes have their most significant bit (MSB) set to a binary zero.

This configuration achieves that the data packet has a simple, easily identified structure and that the various information carrying portions thereof easily can be extracted from the packet.

Figure 8:
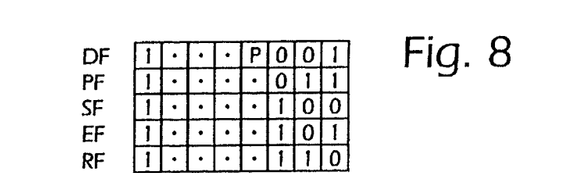
FIG. 8 shows the configuration of various flags.

In FIG. 8 the specific configuration of the various flag bytes is illustrated. Their last three bits, the least significant bits are used for distinguishing between them. The destination flag also contains information of the priority of the data packet, as indicated by the bit marked "P".

Also shown in FIG. 8 is an additional type of flag byte denoted "RF", which, however, is not directly associated with the transmitted message but instead is used for informing the state of a receiving node to a sending node. This response flag RF is always sent from a sending unit when the sending unit has no data packet left to be sent in its buffer. Further, always such a response flag RF is sent, as has been mentioned always in the shape of one byte, when the state is changed in a receiving unit. Owing to the unique configuration of the flags they may always be distinguished from the information carrying fields themselves and it is in particular true for these response flags RF, which may be inserted or added at any place inside a data packet which is being forwarded to a receiving unit. This procedure of transmitting important state information minimizes the waiting times in the system, since it may be immediately signalled, that a buffer is empty and is ready to receive a new data packet.

Figures 9, 10:
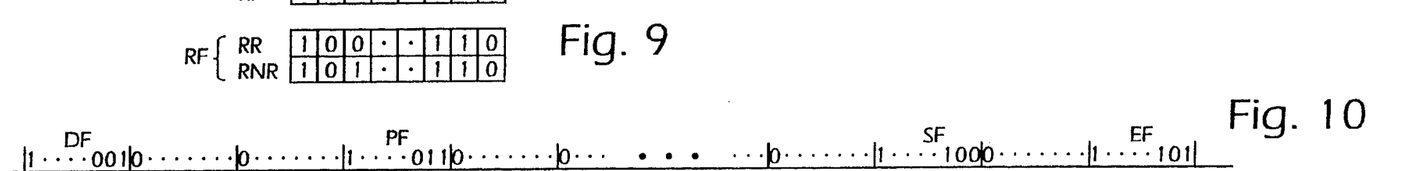
FIG. 9 shows the configuration of response flags.
FIG. 10 shows a typical data packet and FIG. 11 shows a data packet having a response flag inserted therein.

The response flag RF has in the simple case two shapes, as is shown in FIG. 9:

RR=the sending unit is ready to receive data, and

RNR=the receiving unit is not ready to receive data.

The short names RR and RNR will be used for denoting the response flag RF having the corresponding shapes.

The bits inside the flag bytes which are not used according to FIGS. 8 and 9 (there indicated by dots) may at will be used for transmitting special information.

Figure 11:
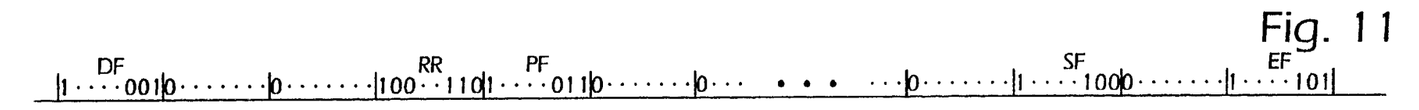

In FIG. 10 a normal data packet is illustrated having two destination address bytes and one source address byte. In FIG. 11 the same data packet is shown having a response flag of type RR inserted before the payload flag PF.

Figure 2:
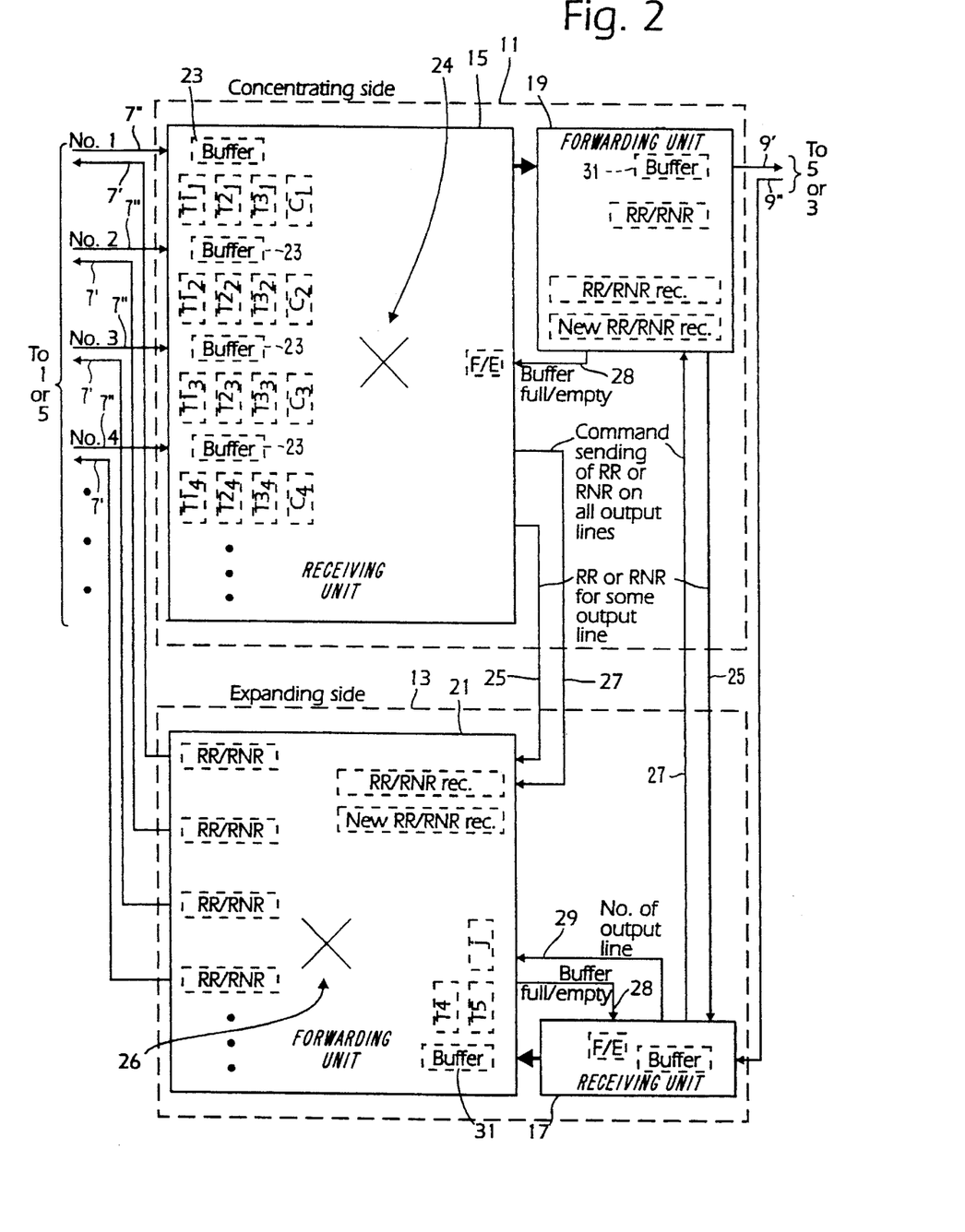
FIG. 2 is a schematic picture of the function blocks in a node in such a network.

In FIG. 2 it is schematically illustrated how a concentrating/expanding node can be constructed. Each connection or link, which in FIG. 1 is illustrated as a single line, is in fact made from two lines, one, the output line for sending or transmission and one, the input line for receiving. Thus each connection 7 on the side of a node facing away from the principal node 3, that is in the expansion direction, is constructed from two lines 7' and 7". On the line 7' data packets are forwarded from the node and on the line 7" data packets are received. The connections 7 are numbered in some suitable way such as given numbers 1, 2, . . . In the corresponding way the only connection 9 on the side of the node, which is directed towards the principal node 3, that is in the concentration direction, is built from two connections 9' and 9", in such a way that on the line 9' data packets are sent away from the node and on the line 9" data packets are received in the node.

The node comprises a concentrating side 11, which handles, processes and forwards data packets passing in the direction towards the principal node 3 or another concentrating/expanding node 5. In the corresponding way the expanding side 13 of the node handles data packets arriving from the principal node 3 and are on their way towards some terminal 1 or another concentrating/expanding node 5. Both the concentrating side 11 and the expanding side 13 comprise a receiving unit 15 and 17 respectively and a forwarding or transmitting unit 19 and 21 respectively.

The receiving units 15, 17 are constructed in a similar way to each other on the concentrating and expanding side 11, 13, with the exception that the receiving unit 15 on the concentrating side has several input ports, each one connected to an input buffer, indicated at 23, and a switch, indicated at 24, for sending the contents of one of these buffers 23 to the transmitting unit 19 of the concentrating side. To each buffer 23 belong three timers T1, T2 and T3 and one byte counter C. The symbols of the timers and the counter are provided with suitable indices to denote the number of the input line 7" and the buffer 23, with which they are associated. The timers T1 and either T2 or T3 for a buffer 23 may be the same logical unit, since the timer T1 is not used at the same time as the other timers. There may also be an indicator F/E storing a value representing the state of the forwarding unit 19 on the same side, i.e. if the forwarding unit 19 is not ready or is ready to receive a new data packet to be transmitted.

In the same way also the forwarding units 19 and 21 in the concentrating and the expanding sides 11 and 13 respectively are built similarly to each other, with the obvious exception that the forwarding unit 21 on the expanding side 13 has a multitude of output connections 7', which are selected by means of a switch device, indicated at 26, inside the forwarding unit 21. Such a switch device is not required in the forwarding unit 19 on the concentrating side 11, since the forwarding unit 19 there only has one output connection 9'. The forwarding unit thus comprises a buffer 31 for a data packet transferred from the receiving unit 17 on the same side and associated with the buffer 31 two timers T4 and T5. There is also a storage location for storing the actual number j of the output line 7', on which a data packet in the buffer 31 is to be or is transmitted. For each output line 7' there is an indicator RR/RNR storing the status of the receiver connected to the other end of the considered output line 7'. Two registers "RR/RNR rec." and "New RR/RNR rec." store values signifying the previous and possibly the new state of the receiving unit 15 in the same node.

The various units comprised in the node preferably comprise circuits for performing the logical choices and the required processing of arrived data packets. Only a small number of signalling lines are required for connecting the concentrating side 11 to the expanding side 13. Instead of individual units having logic comprised therein apparently a central microprocessor, located in the node, can be used, but it is generally too slow to be able to have time for the data processing in real time, which is required in the transmission of data packets through the node over the network.

There are of course lines inside the node connecting the receiving unit 15 and 17 with the forwarding unit 19 and 21 respectively on the same side, these lines conveying a received data packet to be transmitted. There is also a signalling line 28 connecting the same devices indicating to the receiving unit the state of the forwarding unit. Also, from the receiving unit 17 on the expanding side 13 there is a line 29 indicating the number of the output line 7' on which a received data packet is to be forwarded, i.e. the number j mentioned above. From each receiving unit 15 and 17 there are also two signalling lines 25, 27 connected to the forwarding units 21 and 19 respectively, which are not on the same side in the node but which are connected to the same links 7 or 9, the first line 25 indicating the state of an output line 7' or 9', i.e. if the receiver connected to this output line is ready or not, this value being stored in the register RR/RNR mentioned above, and the other line 27 transferring the state of the receiving unit 15 or 17 respectively, a value representing this being stored in the register "New RR/RNR rec." mentioned above.

Figure 3A:
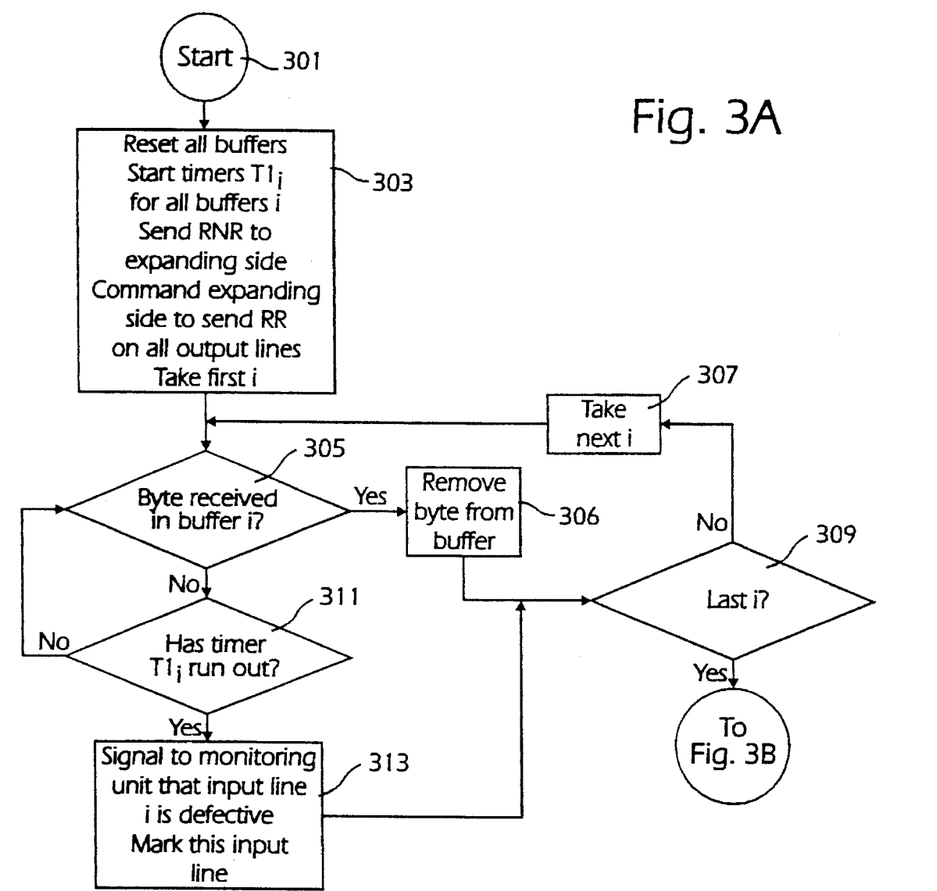
FIGS. 3A and 3B show a flow chart of a receiving unit in a node.
Figure 3B:
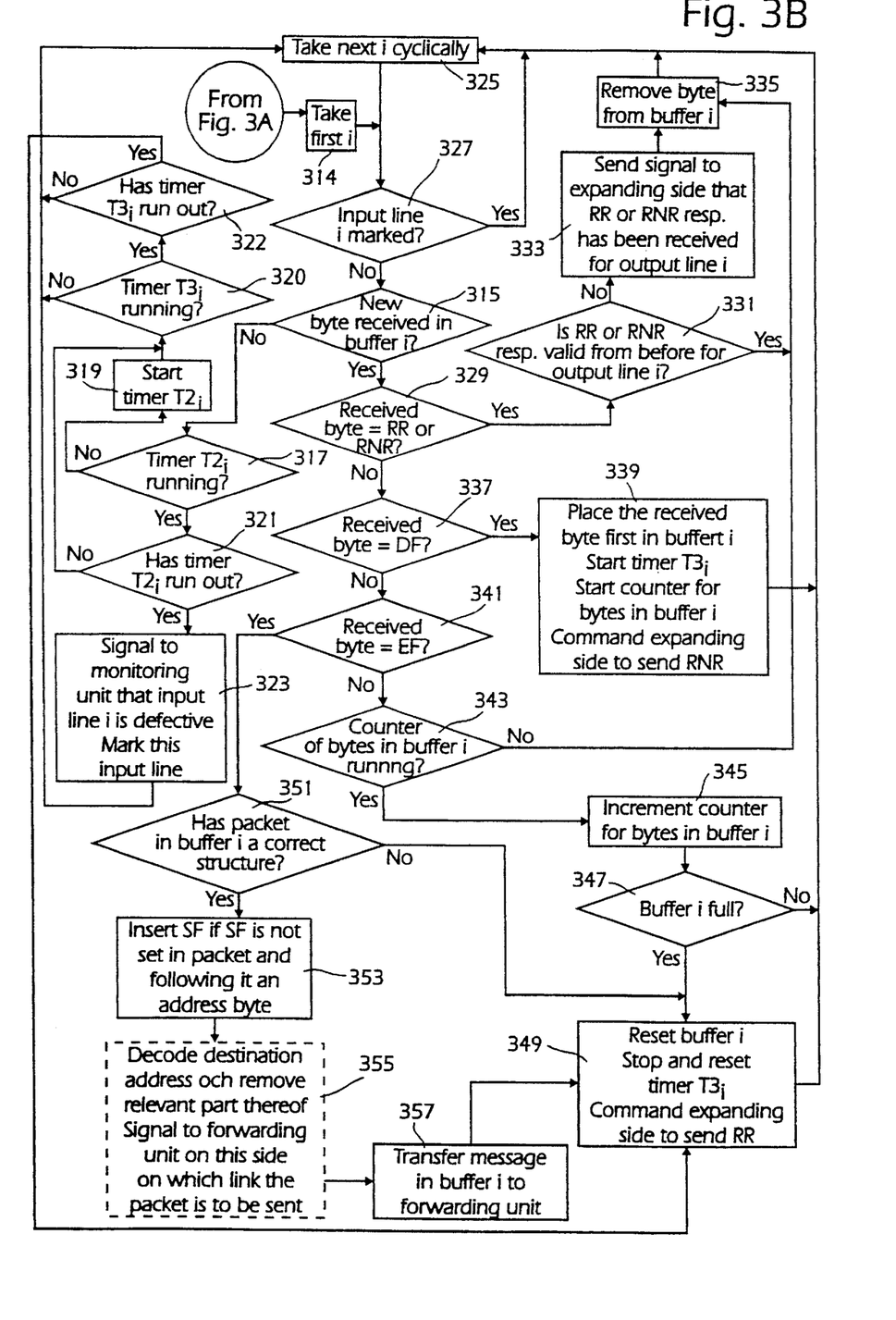
Figure 4:
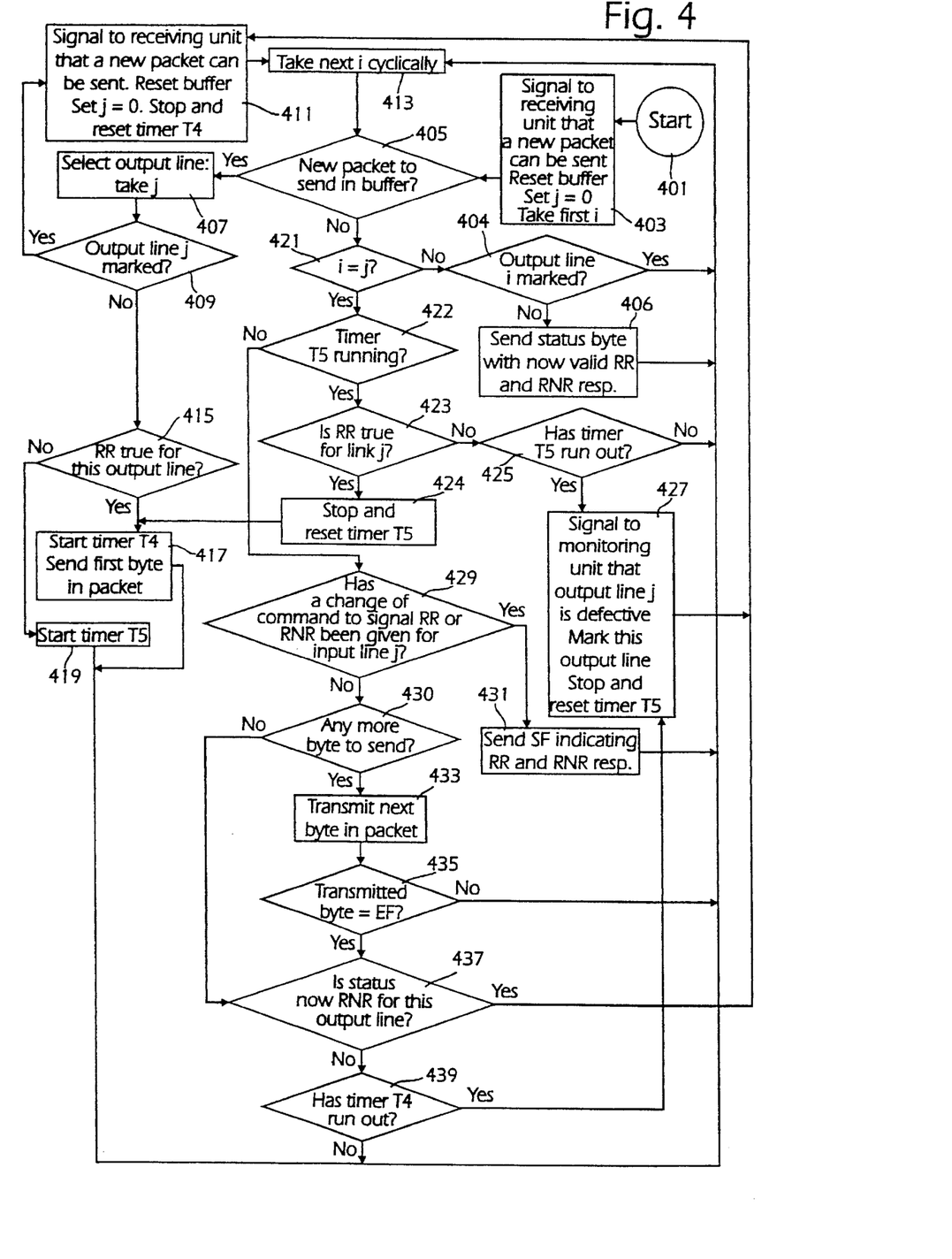
FIG. 4 shows a flow chart of a transmitting unit in a node.

The procedure in the transmission of data packets over the network will now be described in more detail with reference to flow charts as shown in FIGS. 3 and 4, illustrating the logical steps, which must be performed in the receiving unit 15 on the concentrating side 11 and in the forwarding unit 21 on the expanding side 13. These logical charts can, however, also easily be used for the receiving unit 17 and the forwarding unit 19 having their only connection 9', 9" directed towards the principal node 3. The process is described for the case with one control processor for each one of the receiving and the forwarding units 15 (17) and 21 (19).

The process, which is illustrated in the flow chart in FIG. 3A and FIG. 3B and thus is performed by the receiving unit 15, starts in a start block 301 in FIG. 3A. After the start the system is initiated in a block 303 and here all the buffers are reset, which are located in the receiving unit 15 in this case and are indicated at 23 in FIG. 2. Thereafter the timer $T1_i$ is started for each one of the buffers 23 having serial numbers i, i=1, 2, . . . corresponding to the numbering of the connection lines 7', 7". Further a message is sent to the expanding side 13 and the forwarding unit 23 thereof, that the state RNR is true for all output links 7'. In this way the forwarding unit 21 cannot start sending anything, until the message has been changed in regard of the state of some link 7'. The message that RNR now is true for all outgoing lines 7' is transmitted on the line 25 (FIG. 2) from the receiving unit 15 to the forwarding unit 21 connected to the same links. Since now also the receiving unit 15 on the concentrating side 11 is ready to receive incoming messages or data packets, it is also commanded on the line 27 from the receiving unit 15 to the forwarding unit 21, that the forwarding unit 21 on the expanding side 13 shall forward, when this will be possible, flag bytes containing RR on all of its output lines 7'.

After this it shall be checked, that all the incoming lines 7" are active. In the normal case, when no data packet is sent on a connection line between two nodes, an idling or no load pattern is sent thereon, comprising either flag bytes (response flags RF) containing RR or RNR. A variable i denoting the number of the input lines 7" is set to its first value, e.g. it is set to 1, this number i corresponding to the numbering of the links 7, at last in the block 303 and then it is checked in a block 305, if any byte has been received in the buffer 23 having serial number i. If a byte has been received, it is removed from the buffer with number i in a step 306 and then it is checked, if the next buffer in the sequential order has received a byte. This is made by first deciding in a block 309, if all buffers 23 already have been checked in this way. If not all buffers have been run through, the serial number i is incremented in a block 307 and then the program flow returns to the block 305, where the buffer with the next serial number i is checked, if any byte has been received therein.

When all serial numbers i have been run through, i.e. all input lines 7" have been checked, the program flow continues to a block 314 (FIG. 3B). Further, if it is decided in the block 305, that a byte has not yet been received in the buffer having the serial number i, it is checked in a block 311, if the timer $T1_i$, corresponding to this buffer having serial number i, has run out. If it has not run out, the program flow again returns to the block 305 for checking, if a byte during the meantime has been received in the buffer having serial number i.

If it has been decided in the block 311, that the timer $T1_i$ for the buffer having the serial number i has run out, i.e. that no byte has been received on the input line 7" having the serial number i during a time period determined in advance, the program flow continues to a block 313. In this it is signalled to some monitoring unit for the whole system (not shown in the Figures), that the input line 7" having the serial number i is defective. Further, this connection line is marked as defective, such that it can be skipped in later steps in the execution of the program flow. After the block 313 the connection line having the next serial number shall be checked and thus the program flow continues to the block 309.

When now all input links 7" have been checked and the initiation thus is finished, the program control continues to a block 314 (FIG. 3B), as has been mentioned above. In this block 314 a first value i, e.g. i=1, for the serial number of the buffers 23 or the connection lines 7 is taken and then it is tested in a block 327, if the corresponding input line is marked as defective. If this is the case, the next serial number i is taken cyclically in a block 325, after which the program flow returns to the block 327.

If it is decided in the block 327, that the input line with number i is not marked as defective, it is tested in a block 315, if any new transmitted byte has been received in the buffer belonging to the input line having the serial number i. If a byte has not been received in this buffer, it shall be checked again, that this input line 7" having the serial number i is functional. Therefore the program control continues to a block 317, where it is checked, if the timer $T2_i$ for this buffer and the input line having serial number i is running. If this timer is not running, it is started in a block 319, after which it is determined in a block 320, if the timer $T3_i$ is running. If it is not running, the program flow continues through the block 325 to the block 327 for checking the buffer and connection line having the next serial number. If it was decided in the block 320 that the timer $T3_i$ is running, this timer is tested for time-out in a block 322. If it has not yet run out, the program control continues to the block 325 as above. However, it actually has passed to time-out, that is exceeded some predetermined threshold value, the program flow continues to a block 349 to be described below.

If it has been decided in the block 317, that the timer $T2_i$ is running, there is checked in a block 321, if this timer has run out, i.e. passed a threshold value determined in advance. If this is not the case, the next buffer and connection line having the serial number i shall be examined in the block 327 (through the block 325).

If it is decided instead in the block 321, that the timer $T2_i$ has passed its threshold value and thus has run out, it is signalled in a block 323 (compare block 313 in FIG. 3A) to a monitoring unit, that the input line 7" having this serial number i is defective, that is that the forwarding unit connected to the other end of this line is not able to send anything on this input line. Further, it is also marked, that this input line is defective. After this the buffer having the next following serial number i is to be examined. Therefore the program flow continues to the block 325, from which the program control also continues from the block 321 for the case, that the timer $T2_i$ started and examined therein has not run out.

In the block 325 the next serial number i for the input line 7" and the buffer is taken, whereafter, as has been mentioned earlier, it is examined in the block 327, if the input line having the serial number i is marked as defective. If this is the case, the next serial number i is taken in the block 325. If the input line having the serial number i is not marked as defective, the program flow continues to the block 315 as above to determine, if a byte has been received in this buffer having the serial number i, after the preceding checking occasion.

If the reply thereto is yes, that is if a new byte has been received, it is examined in a block 329, if this received byte is a flag byte containing RR or RNR. If this is the case and thus for instance this received flag byte belongs to an idling pattern according to the above, it is examined in a block 331, if a change of state RR and RNR respectively has been changed for this link, i.e. if the latest received response flag byte contained RR or RNR. If a change has occurred, the program flow continues to a block 333 and on the line 25 this change of state is informed to the forwarding unit 21 of the expanding side 13, such that the forwarding unit is informed, whether it can forward or not forward messages on its output line 7' having the serial number i. The received byte is not needed any more in this case and is therefore removed from the buffer in a block 335. Then the buffer and connection line having the next following serial number i is to be examined and thus the program flow continues to the block 325 as above.

If it instead is decided in the block 331, that a change in regard of state for RR and RNR respectively for this link has not been made, the program flow continues to the block 335, where in the same way the received byte is removed from the buffer and then the buffer having the next serial number i is examined as above by continuing to the block 325 and the blocks following thereafter.

If it in the block 329 is decided, that the received byte is not a flag byte containing RR or RNR, it is examined in a block 337, if the received byte signals the beginning of a data packet, i.e. is a byte containing the destination flag DF. If this is the case, this byte is to be placed first in the buffer having the serial number i and it is performed in a block 339. In this block also the timer $T3_i$ is started thus indicating, that the reception of a data packet has started. In a later step it will then be checked, that the whole data packet has been received within a predetermined time period, i.e. that this timer $3_i$ having the serial number i has not exceeded some threshold value. Further, the number of received bytes in the buffer number i is counted in some way, for instance by using and thus starting the byte counter $C_i$ with serial number i (FIG. 2). Since in addition now the receiving unit 15 probably will be blocked by the reception of a data packet, all the incoming lines 7" shall be marked as occupied and therefore through the line 27 (FIG. 2) the forwarding unit 21 of the expanding side 13 is commanded to send flag bytes RF with RNR. When all this has been done, the buffer and the connection line having the next serial number i will be examined and therefore the program control continues to the step 325 as above.

If it in the block 337 is decided, that the received byte is not a flag byte of the type destination flag DF, it is examined in a block 341, if the received byte instead is a flag byte of the type terminal or end flag EF. If this is not the case, it is checked in a block 343, if the byte counter $C_i$ for this buffer having serial number i is running. If this is not the case, the received byte does not belong to a correct data packet, since the byte signalling the beginning of a data packet has not been received. Therefore the program flow continues to the earlier described block 335, where this received byte is removed from the buffer 23 having serial number i and then the buffer and the connection line 7 having the next serial number i is examined in the block 327 as above.

If it in the block 343 instead is decided, that the byte counter $C_i$ has been started, this counter is incremented in a block 345 and then it is decided in a block 347, if the buffer 23 having the serial number i is full. Every data packet is supposed to have a certain maximum length and the buffers 23 are dimensioned for this length having a space for a few bytes more. If the buffer 23 is not full, as above the program flow continues to the step 325, where the buffer 23 and input line 7" having the next serial number i is taken.

If it instead is decided in the block 347, that the buffer 23 is full, this buffer cannot receive any more bytes and the received message must be defective. Therefore in that case the program control continues to a block 349, where this buffer is reset. In addition the timer $T3_i$ is reset and stopped, which applies to this buffer having serial number i and which has been started in the block 339. The receiving unit 15 is now ready to receive a new data packet and therefore commands, through the line 27, the forwarding unit 21 in the expanding side to transmit at least one flag byte RF containing RR. Thereafter the serial number i is cyclically increased for the input line 7" and buffer 23 in the block 325 and this line is examined as above.

If it was decided in the block 341, that the received byte in the buffer 23 having serial number i is a flag byte containing the terminal or stop flag EF, a complete data packet probably has been received in this buffer. Thus it is in addition checked in a block 351, that the received data packet has a correct structure and especially that all the essential flag bytes are there and have the correct order, see FIG. 5. If the packet is not in order, the unit 15 must be made ready for the reception of a new data packet and therefore the program flow continues to the block 349, as has been described above.

If it is decided, however, in the block 351, that the received packet has the correct structure, the address information is inserted in a block 353. This means that the source address flag SF is inserted and after it an indication of the input port, on which the received data packet has arrived, i.e. information of the serial number i. After that the data packet is ready to be forwarded and is therefore transferred to the forwarding unit 19 on the concentrating side 11 in a block 357, if this is possible. The condition of the forwarding unit is obtained from the state of the indicator F/E mentioned above provided, which is set by a signal on the line 28 (FIG. 2) from the forwarding unit 19 indicating, if the forwarding unit 19 is ready to receive a data packet for sending, as has been discussed above. Thereafter the receiving unit 15 is ready to receive a new data packet and thus the program flow passes to the block 349, as has been described above.

In the receiving unit 17 on the expanding side 13 the same process is performed as has been described above with reference to FIGS. 3A and 3B, however with the exception that the serial number i cannot vary but always has the value of for instance 1. For this receiving unit 17 no source address flag SF should be inserted like in the block 353. Instead a block 355 is performed and therein, in the receiving unit 17 on the expanding side 13 a destination address is decoded following the destination flag DF in the received data packet. By means of this address information containing e.g. a desired serial number, the forwarding unit 21 on the expanding side 13 is to select the correct output line 7' and therefore this address information is transferred by means of the line 29 (FIG. 2) from the receiving unit 17 to the forwarding unit 21 on the expanding side 13 and stored in the register "j", as has been discussed above. The address information used in this node is then removed from the destination address field.

In FIG. 4 a process is illustrated, which is executed in the forwarding unit 21 on the expanding side 13. The process starts in a start block 401 and first it is signalled to the receiving unit 17 on the same side, that a new data packet can be transferred to the buffer 31, this signalling being made on the line 28 mentioned above. At the same time the buffer 31 is reset and also the stored number j denoting the selected output line 7'. Then a start value, e.g. 1, for the serial number of the output lines 7' is taken in a block 403.

After that it is decided in a step 405, if in the buffer 31 in the forwarding unit 21 (FIG. 2) there is a new data packet, which is to be forwarded. If this is not the case, an idling pattern shall be sent. Therefore all different connections must be run through. The output lines 7' are as above supposed to be numbered 1, 2, . . .

If it has been decided in the block 405, that a new packet to be forwarded is located in the buffer 31, it is decided in a block 407 the output connection, on which the packet is to be sent, and in particular the number j thereof, which then will be different from zero and which is taken from the storage location "j" (FIG. 2). Then it is decided in a block 409, if this output line 7' having serial number j is marked as defective. If this is the case, the packet in the buffer 31 cannot be forwarded and is not allowed to stop further transmission in the network. Therefore the buffer 31 is reset in a block 411 and the serial number of the output connection j is set to 0. Further the timer T4 is stopped and reset in the sending unit 21, which timer will be described below. A signal is also sent on the line 28 (FIG. 2) to the receiving unit 17 on the same side 13, that a new data packet can be transferred for sending.

Thereafter the program control continues to a block 413, in which the next serial number i for the output line 7' is taken in a cyclical way, that is through the values of the link numbers repeated from the beginning. Then it is again examined in the block 405, if a new packet in the buffer 31 is to be sent and the procedure according to the above is repeated.

If it was decided in the block 409, that the output line 7' having the serial number j has not been marked as defective, it is decided in a step 415, if the state of this output line is RR, as has earlier been received from the receiving unit 15 on the concentrating side 11 on the internal line 25 and stored in the register "RR/RNR" for this output line. If this is not the case, the timer T5 is started in a block 419 and then the program flow continues to the step 413 as above. If it was decided in the block 415, that the output line 7' having serial number j is ready for forwarding, i.e. that RR is true for this line, the timer T4 is started in the forwarding unit 21 in a block 417 and then the first byte in the packet in the buffer 31 is transmitted. After this the program flow continues to the block 413 as above.

If it was decided in the block 405, that there was no new packet to send in the buffer 31, it is checked in a block 421, if there is already a packet in the buffer, which is in the process of being sent on this output line having serial number i. It is performed by the way that it is decided, if the serial number i is equal to the stored serial number j, which belongs to the output line 7', on which a possible data packet is to be sent. If this is not true, it is decided in a step 404, if the output line 7' having serial number i is marked as defective. If this is the case, this output line is skipped and the program flow continues to the block 413, where the next serial number i is taken as above.

If it was decided in the block 404, that the output line 7' having the serial number i is not marked as defective, in a block 406 a status byte RF is transmitted on this output line i, which contains RR and RNR respectively, as to what is true from the earlier state for this output line and has been received from the receiving unit 15 of the concentrating side 11 and stored in the registers "RR/RNR rec." and "New RR/RNR rec.". If the value in the register "New RR/RNR rec." is not zero, it is used, otherwise the register "RR/RNR rec.". In the former case also the value comprised in the register "New RR/RNR rec." is transferred to the register "RR/RNR rec." and the register "New RR/RNR rec." is reset. When this has been performed, the program flow continues to the next serial number i for the output line 7' in the block 413 as above.

If it was decided in the block 421, that there is a packet in the buffer 31 and that it is in the process of being transmitted on the considered output line, it is decided in a step 422, if the transmission actually has started. Therefore it is checked, if the timer T5 has been started (compare step 419). If the timer T5 is running, it is checked in a step 423, if RR has begun to be true for this output line. If RR is not true, it is decided in a step 425, if this timer T5 has run out, i.e. if the value thereof exceeds some predetermined threshold value. If this is not the case, the program flow continues to the step 413 and a new serial number i is taken as above.

If, however, the timer T5 has exceeded its threshold value, this means, that it is not possible to send anything on this output line 7' and therefore it is signalled in a block 427 to a monitoring unit, located somewhere in the network, that this output line 7' having serial number j is defective. Further, also this output line is marked as defective. The timer T5 is stopped and reset. The packet in the buffer 31 can thus not be forwarded and accordingly the program flow continues to the block 411, which has been described above and in which an initiation is performed for the reception of a new packet in the buffer 31.

If it has been decided in the block 423, that the state now is RR for the output line 7' having the serial number j, the transmission of the data packet can be started. Therefore the timer T5 is stopped and reset in a block 424 and the program flow continues to the block 417, which has been described above.

If it was decided in the block 422, that the timer T2 is not running, i.e. that the output line having the serial number j is ready, it is decided in a block 429, if the forwarding unit 21 on the line 27 has received a change of an order for signalling RR or RNR respectively for this output line having the serial number j. This is performed by testing the registers "RR/RNR rec." and "New RR/RNR rec.". If the latter register has a content different from zero and differing from the value stored in the register "RR/RNR rec.", a new status flag must be sent and also the value stored in "New RR/RNR rec." is transferred to the other register "RR/RNR rec." and the former register is reset. In a block 431 a status byte or response byte RF containing RR or RNR respectively, this value being obtained from the reset register, is then inserted in the normal transmission sequence on this output line 7' having the serial number j, after which the program flow continues to the block 413 as above.

If it was decided in the block 429, that there has not been any change of the order of signalling RR or RNR respectively, it is examined in a block 430, if there are any more bytes to transmit in the buffer 31. If this is true, the next byte of the packet in the buffer 31 is sent in a block 433. Then it is determined in a block 435, whether the transmitted byte indicates the end of the packet, i.e. if this byte is a flag byte of the stop type EF. If this is not the case, more bytes must be sent from the buffer and thus the program flow continues to the block 413 as above.

If instead the transmitted byte is a stop flag EF, i.e. when all bytes of the data packet has been sent, a further check is performed. As has been described above, the receiving node, which is not visible in FIG. 2, is to send a response byte RF having the content RNR, as fast as this node has begun the reception of a data packet. Therefore it must be checked, if this flag byte actually is sent within a reasonable time period after the transmission of the data packet was started. Thus it is decided in a block 437, if status during the transmission has been changed to RNR for this output line having the serial number j. It is simply performed by examining the content of the register RR/RNR for this output line 7' and if it now contains the indication that RNR is true, everything is in order. This is normally the case and if the decision thus is positive, the program flow continues to the block 411 containing the preparation for receiving a new packet for transmission.

If such a change of state to RNR has not occurred during the transmission of the data packet, it is decided in a block 439, if the timer T4, which was started in the block 417, has run out, i.e. has exceeded some predetermined threshold value. If this is not the case, the program flow continues to the step 413 as above. If instead the timer T4 has run out, the output line is defective and the program flow continues thus to the step 427, as has been described above.

If it was determined in the block 430, that there were no more bytes of the data packet in the buffer 31 to be forwarded, the program control continues to the block 437 for examining if the desired status change for the output line has occurred.

The process according to FIG. 4 can also be applied to the forwarding unit 19 on the concentrating side 11, if the serial number i is limited to only one value such as 1.

The processes described above with reference to the FIGS. 3 and 4 can in a real embodiment be performed by hardware circuits or a signal processor belonging to each input line or output line or buffer respectively. This may be necessary in order to have time to make the signal processing in real time and that no received bytes should be missed or to have time for the transmission of the various bit patterns on the output lines at the same time as the transmission of a data packet on an output line. Such a division of tasks suitable for separate, parallel processing is simply made, since the processes for different values of the serial number i are independent of each other and only require the communication between the different, major units 15–21 in FIG. 2 on a few control lines.

What is claimed is:

1. A method of transmitting information from one station to another station comprising the step of sending data packets from the one station to the other station, each data packet comprising:

at least one information field comprising an integral number of bytes; and at least two flags, wherein each flag indicates one of the beginning of an information field and an ending of an information field, each flag is one byte long, and each flag contains a predetermined bit of a predetermined value different from values corresponding predetermined bits of other bytes, wherein the value of the predetermined bit in each byte directly indicates whether the corresponding byte is a flag.

2. The method of claim 1, wherein predetermined bits of each byte in a flag have respective predetermined values and corresponding bits of each byte in an information field have different predetermined values.

3. The method of claim 1, wherein a predetermined bit of each byte in a flag has a first predetermined value and a corresponding bit of each byte in an information field has a second, different predetermined value.

4. The method of claim 1, wherein each flag comprises one byte and a value of a first bit of the sequence of bits comprising the one byte indicates that the one byte is a flag.

5. A communication network comprising:

a plurality of stations for sending and receiving data packets; and communication links between the stations for carrying the data packets between the stations, wherein each data packet comprises a respective sequence of an integral number of bytes forming an information field and flags respectively indicating the information field's beginning and ending, each byte consisting of a predetermined number of bits, each flag comprises one byte that includes a predetermined bit of a predetermined value different from values of corresponding predetermined bits in other bytes for directly indicating whether the one byte corresponds to a flag or the information field, and each station includes means for inserting and deleting bytes in data packets and means for determining whether a received byte corresponds to a flag or to an information field.

6. The communication network of claim 5, wherein the determining means comprises means for determining whether predetermined bits of a received byte have a first set of predetermined values, the received byte corresponding to a flag when the predetermined bits have the first set of predetermined values and to the information field when the predetermined bits have other values, and the inserting and deleting means sets values of the predetermined bits of a byte to the first set of predetermined values when a byte corresponding to a flag is inserted and to the other values when a byte corresponding to an information field is inserted.

7. The communication network of claim 5, wherein the determining means comprises means for determining whether predetermined bits of a received byte are set to a second set of predetermined values, the received byte corresponding to an information field when the predetermined bits are set to the second set of predetermined values and to a flag when the predetermined bits are set to other values, and the inserting and deleting means sets values of the predetermined bits of a byte to the second set of predetermined values when a byte corresponding to an information field is inserted and to the other values when a byte corresponding to a flag is inserted.

8. The communication network of claim 5, wherein the determining means senses the value of a predetermined bit of a received byte and compares the sensed value to a first predetermined value, the received byte corresponding to a flag when the sensed bit has the first predetermined value and to an information field when the sensed bit has another value, and the inserting and deleting means sets the value of the predetermined bit of a byte to the first predetermined value when a byte corresponding to a flag is inserted and to the other value when a byte corresponding to the information field is inserted.

9. The communication network of claim 5, wherein the determining means senses the value of a predetermined bit of a received byte and compares the sensed value to a second predetermined value, the received byte corresponding to an information field when the sensed bit has the second predetermined value and to a flag when the sensed bit has another value, and the inserting and deleting means sets the value of the predetermined bit of a byte to the second predetermined value when a byte corresponding to an information field is inserted and to the other value when a byte corresponding to a flag is inserted.

10. The communication network of claim 5, wherein each flag comprises only one respective byte, and values of first bits of bytes indicate whether the respective bytes are flags.

11. The communication network of claim 5, wherein each station further includes:

means for inserting control information into a data packet to be sent and for removing control information from a data packet received, the inserted and removed control information each comprising at least one byte; and means for determining whether a received byte corresponds to control information and for providing control signals for the station based on the determination, wherein the control information comprises information for controlling sending and receiving of data packets in lines between two stations.

12. The communication network of claim 11, wherein the control information inserted by the inserting means of a first station into a data packet sent to a second station indicates whether the first station is ready to receive a data packet from the second station, the inserted control information comprising at least one predetermined byte, and is detected by the determining and controlling means of the second station.

13. The communication network of claim 11, wherein each byte corresponding to information that is not control information includes predetermined bits having a first set of predetermined values, and in each byte corresponding to control information the predetermined bits have a second set of predetermined values different from the first set of values.

14. The network of claim 11, wherein the control information comprises one of one byte and a sequence of bytes, the sequence of bytes being short compared to the data packets.

15. In a method of communicating data packets on a line between a first station and a second station in a network, the data packets comprising sequences of integral numbers of bytes that each consist of a predetermined number of bits and each station having a first state in which the station is ready to receive a data packet from the other station and a second state in which the station is not ready to receive a data packet from the other station, a method of controlling transmission in a first direction from the first station to the second station and in a second direction from the second station to the first station comprising the step of sending data information from one station to the other station, the data information comprising a sequence of predetermined bytes, the sequence including at least one predetermined byte and being short compared to the data packets, and the sequence of predetermined bytes indicating whether the one station is in the first state or the second state and having a configuration that can be identified by the other station.

16. The method of claim 15, wherein each byte transmitted in the network comprises a respective sequence of a predetermined number of bits; in each byte belonging to a data packet predetermined bits have values in a first set of predetermined values, and in each byte that indicates a state of a station, the predetermined bits have values in another, different set of predetermined values.

17. A communication network comprising:

a plurality of stations for sending and receiving data packets, each station having a first state in which the station is ready to receive a data packet from another station and a second state in which the station is not ready to receive a data packet from an other station; and communication links between the stations for carrying the data packets between the stations, wherein information in the network is transmitted as bits; each data packet comprises a respective sequence of an integral number of bytes, each byte consisting of a predetermined number of bits; and for control of sending and receiving data packets between two stations information is used that is inserted in the data packets which are transmitted in the network and which primarily contain other information, and each station further includes:

means for inserting control information into a data packet to be sent and for removing control information from a data packet received, the inserted and removed control information each comprising at least one byte; and means for determining whether a received byte corresponds to control information and for providing control signals for the station based on the determination, wherein the control information comprises information for controlling sending and receiving of data packets between two stations.

18. The network of claim 17, wherein the control information comprises one of one byte and a sequence of bytes, the sequence being short compared to data packets transmitted in the network.

19. The network of claim 17, wherein each byte transmitted in the network comprises a respective sequence of a predetermined number of bits; in each byte belonging to a data packet that does not indicate control information predetermined bits have values in a first set of predetermined values, and in each byte that indicates the control information, the predetermined bits have values in another, different set of predetermined values.

20. The network of claim 17, wherein the control information inserted by the inserting means of a first station into a data packet sent to a second station indicates whether the first station is ready to receive a data packet from the second station, the inserted control information comprising at least one predetermined byte indicating that the first station is or is not ready to receive data packets, and is detected by the determining and controlling means of the second station.

* * * * *